United States Patent [19]

McLandrich et al.

[11] 4,446,543
[45] May 1, 1984

[54] OPTICAL RESONATOR SINGLE-MODE FIBER HYDROPHONE

[75] Inventors: Matthew N. McLandrich, Carlsbad; Donald J. Albares, San Diego, both of Calif.

[73] Assignee: The United States of America as represented by the Secretary of the Navy, Washington, D.C.

[21] Appl. No.: 54,077

[22] Filed: Jul. 2, 1979

[51] Int. Cl.³ ............................................. H04R 23/00
[52] U.S. Cl. .................................... 367/149; 367/141; 73/655; 350/96.15
[58] Field of Search .............................. 367/141, 149; 250/461 R; 73/655; 356/44, 28.5; 350/96.15

[56] References Cited

U.S. PATENT DOCUMENTS

| | | | |
|---|---|---|---|
| 3,273,447 | 9/1966 | Frank | 73/655 |
| 3,831,137 | 8/1974 | Cuomo | 367/141 |
| 4,075,493 | 2/1978 | Wickersheim | 356/44 |
| 4,154,529 | 5/1979 | Dyott | 356/28.5 |
| 4,193,130 | 3/1980 | Young et al. | 367/149 |

OTHER PUBLICATIONS

"Handbook of Lasers" by CRC Press, Editor Robert J. Pressley, Ph.D. 1971, pp. 163-170.

*Primary Examiner*—Harold J. Tudor
*Attorney, Agent, or Firm*—Robert F. Beers; Ervin F. Johnston; Thomas Glenn Keough

[57] ABSTRACT

A hydrophone remotely senses impinging acoustic energy. Light output from a laser is split and launched into a single-mode fiber which transmits it to an optical resonator at its end. The resonator is made up of a fixed fiber end having a dielectric coating and a movable mirror which is displaced in response to an incident acoustic signal. The acoustic signal displaces the mirror so that mirror movement modulates the intensity of the reflected beam which is transmitted back through the single-mode fiber and received at a detector. The frequency and magnitude of the reflected beam yield acoustic signal information.

4 Claims, 4 Drawing Figures

OPTICAL RESONATOR SINGLE-MODE FIBER HYDROPHONE

BACKGROUND OF THE INVENTION

Hydrophone development has undergone a long and continuous evolution. Many different configurations have varying degrees of sensitivities, bandwidths, etc. Ferroelectric materials have been used for some time and appear to be satisfactory for most purposes. Optical hydrophones recently have demonstrated that some of the problems normally associated with electrical conductors such as excessive power drain, bulk, cross talk, etc., can be avoided.

The Opto-Acoustic Hydrophone disclosed in U.S. Pat. No. 3,903,497 by Morton Stimler et al., concerns itself with the conversion of acoustical signals to corresponding modulated optical signals. This hydrophone transmits the converted signals over a fiber optic cable to a remote location. Acoustic signals impinge on a piezoelectric crystal which amplifies the signals to drive a light emitting diode and feed the signals to a demodulator for conversion to electromagnetic signals and ultimate transmission. This approach does eliminate the long electrical conductors, however, the transducing of the acoustic signals to the light signals and subsequent demodulation of the light signals for retransmission must necessarily degrade the signals validity.

Frank W. Cuomo's "Acousto-Optic Underwater Detector" is described in U.S. Pat. No. 3,831,137 and uses bifurcated bundles of optical fibers. These bundles are arranged in such a way that a light source irradiates an acoustically displaceable reflector which reflects the light back to a detector. It is alleged that the intensity of the reflected light provides an indication of the frequency and amplitude of the impinging acoustical signal.

Two more recent approaches proposed to perform remote, passive acoustic sensing are shown schematically in FIG. 1 and FIG. 2 of the drawings. Both devices rely on the interference of two light beams to determine the amplitude and frequency and impinging acoustic signal. In both methods of operation, the light output of a laser is divided by a beamsplitter into two beams which are launched into separate single-mode optical fibers. One fiber serves as a reference beam path and the other fiber transmits the signal beam to an acoustic sensor.

In the method of operation of the apparatus of FIG. 1, the signal beam is coupled out of the fiber and launched at an angle $\theta$ between two mirrors of high reflectance. One mirror is fixed while the other one is free to move in response to an incident acoustic signal. The movable mirror will be displaced by an amount A which is proportional to the acoustic pressure P of the incident wave. This mirror displacement will produce a phase change in the signal beam of $\Delta\theta = (2\pi/\lambda)(AN/\cos\theta)$ where $\lambda$ is the optical wavelength and N is the number of refections between the mirrors. After the beam exits the mirrors, it is coupled back into another section of signal-mode fiber and transmitted back to the point where the signal is to be observed. Here it is interfered with the reference beam resulting in optical intensity which is given by $I(t) = I_o \cos^2(\pi A(t) N/\lambda \cos\theta)$. Thus, by measuring the amplitude and frequency of I(t), the acoustic signal amplitude and frequency can be determined.

Looking to the optical hydrophone scheme shown in FIG. 2, the acoustic sensor is a coiled, single-mode fiber of length L that suffers an index of refraction change when an acoustic pressure wave is incident on the fiber. This results in a phase change of the signal beam given by $$\Delta\theta = (2\pi PL/\lambda)\frac{\delta n}{\delta p}$$

where P is the pressure of the acoustic signal and $\delta n/\delta p$ is a constant at a given acoustic frequency. When the signal and reference beams are recombined, the resulting intensity is given by $$I(t) = I_o \cos^2\left(\pi PL \frac{\delta n}{\delta p} /\lambda\right),$$

and the acoustic amplitude and frequency can be determined from measurement of I(t).

The disadvantages of these last two devices are similar. Both use separate signal and reference beam fiber paths which can result in relative phase shifts occurring between the two beams which are not due to signal phase shifts. The phase shifts instead are caused by differences in the acoustic/mechanical environments of the two fibers. Furthermore, in the device of FIG. 1, input/output coupling optics are required at the movable sensor. This increases the complexity of the device and makes it very difficult to fabricate.

Thus, there is a continuing need in the state-of-the-art for a highly accurate optical hydrophone which advantageously includes an accurate optical resonator and does not introduce error signals due to having separate reference and signal beam paths.

SUMMARY OF THE INVENTION

The present invention is directed to providing an apparatus for remotely and passively sensing the amplitude and frequency of impinging acoustic energy. A laser source directs a beam down a single-mode optical fiber which is oriented to receive coherent light from the laser for bidirectionally transmitting coherent light therethrough. An optical resonator is coupled to the single-mode fiber optic to introduce interference patterns in a reflected beam which returns through the single-mode fiber optic and is monitored on a detector to give indications of the frequency and amplitude of impinging acoustic energy.

A prime object of the invention is to provide an improved optical hydrophone.

Yet another object of the invention is to provide an optical hydrophone relying on a single, single-mode optical fiber for transmitting a reference beam and a reflected beam of light.

Yet another object is to provide a hydrophone employing an elongate single-mode fiber to allow for remote sensing of acoustic energy.

A further object is to provide a hydrophone deployed to function in the passive mode.

Still another object is to provide an improved optical hydrophone relying upon an optical resonator as its sensing elements.

Another object is to provide a single-mode optical fiber having its end coated with a dielectric substance for optically cooperating with a movable mirror to assure the generation of a phase shifted reflected beam.

Still another object of the invention is to provide an optical hydrophone not requiring external optics thereby resulting in greater simplicity and ease of fabrication.

These and other objects of the invention will become more readily apparent from the ensuing description when taken with the drawings.

DESCRIPTION OF THE PREFERRED EMBODIMENT

Figure 3:
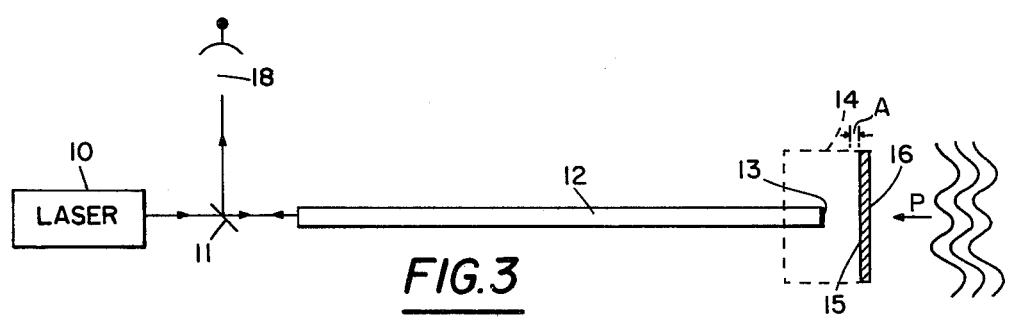
FIG. 3 sets forth in schematic form the preferred embodiment of the invention.

Referring now to FIG. 3 of the drawings, the output beam from a laser 10 is launched through a beamsplitter 11 and into a single-mode optical fiber 12. Optionally, the fiber can extend for only a few centimeters or for several kilometers to permit a remote sensing of acoustic energy. The distal end 13 of the fiber is coated with a dielectric coating and is shaped in a stable configuration, that being, nearly hemispherical.

The coated end of the single-mode fiber functions as a fixed mirror in an optical resonator 14. Another movable mirror 15 is fixed to a compliant membrane 16 which moves in response to incident acoustic waves. Both mirrors are fabricated in accordance with sound optical design practices to obtain the desired reflectances so that a light beam travelling in the fiber will be partially transmitted and reflected in the optical resonator and the reflected beam will be coupled back into the fiber.

Figure 4:
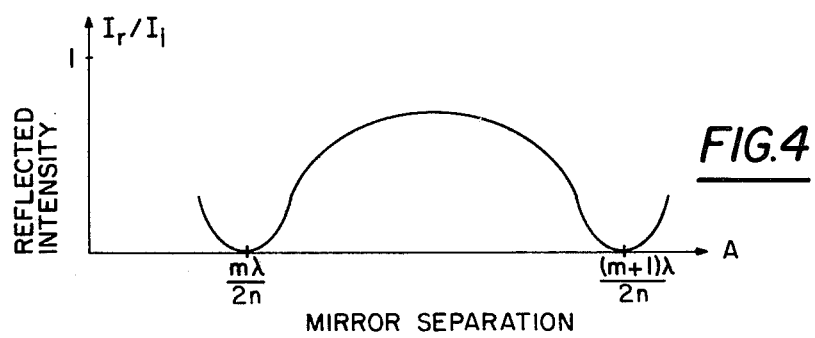
FIG. 4 depicts the intensity of the reflected beam as a function of mirror separation for mirror reflectances equal to 0.27.

Referring to FIG. 4, the ratio of the intensity of the reflected beam $I_r$ as compared to the incident beam $I_i$ is a function of the mirror separation. The wavelength of the transmitted beam is $\lambda$, n is the index of refraction and m is an integer.

When an acoustic pressure wave strikes movable mirror 15, it is displaced an amount A which is proportional to the pressure P. This results in a modulation of the reflected intensity in the optical resonator of the beam due to the change in mirror separation. By measuring the intensity at a detector 18, the amplitude and frequency of the impinging acoustic signal can be obtained.

Figure 1:
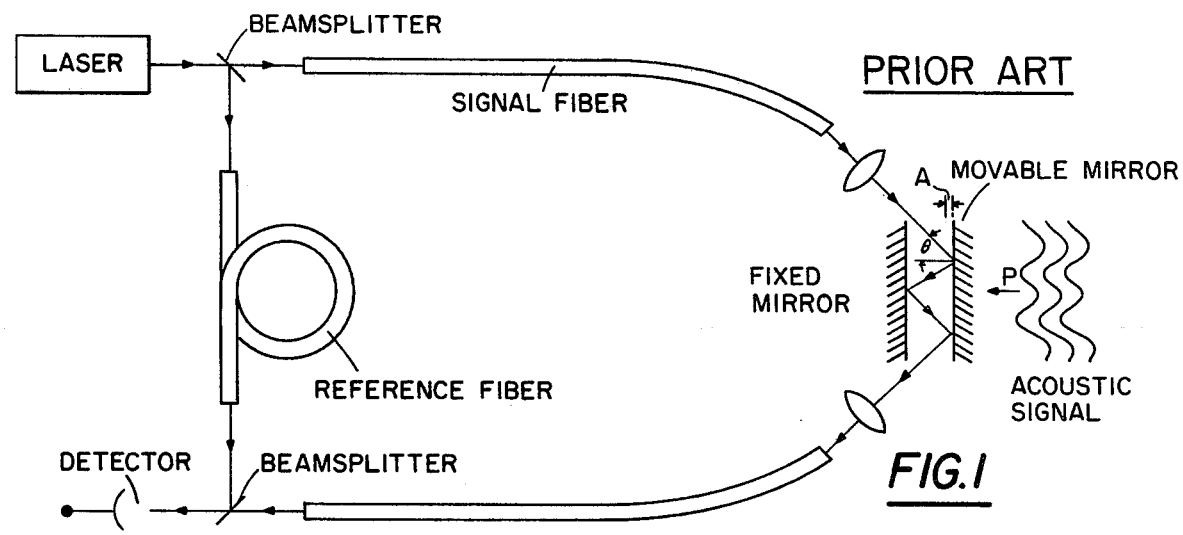
FIGS. 1 and 2 depict two prior art optical hydrophones.
Figure 2:
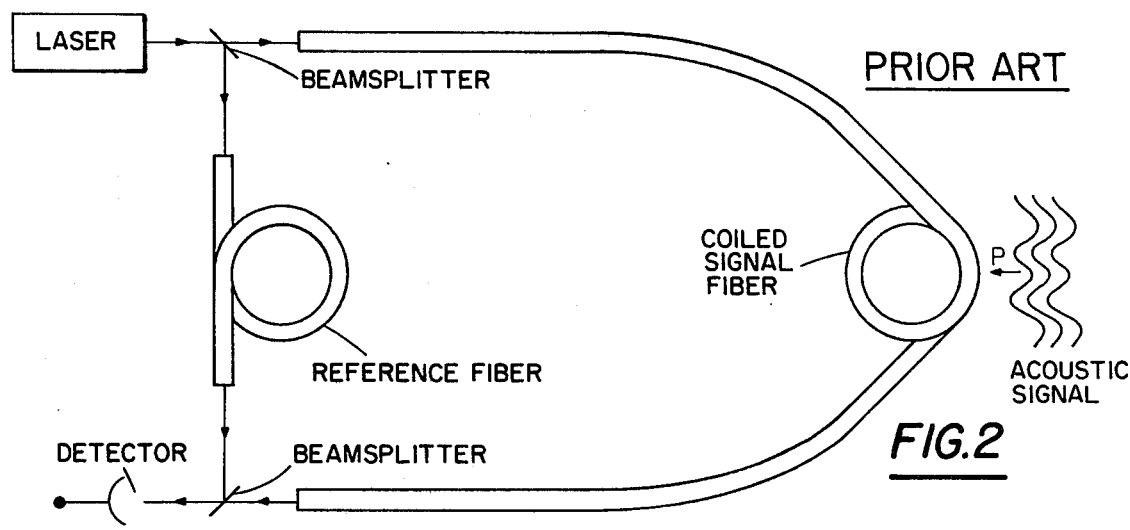

With the aforedescribed arrangement, improved acoustic signal measurement accuracy is assured due to the use of a single fiber for both the incident beam and the reflected beams. The use of a single fiber for the reference and reflected beams eliminates any phase difference that would be introduced due to optical wave guide changes caused by external disturbances or temperature changes. Since both beams are guided in the same fiber, any externally induced phase changes will be experienced by both beams and, hence, there will not be relative phase differences which are not otherwise attributed to that caused by the impinging acoustic signal. Inherently, this feature enhances signal resolution since the interference occurs locally in the optical resonator at the point where the unknown acoustic signal impinges on the detector. There is little, if any chance that noise attributed to external acoustic disturbances or temperature changes will be introduced in the detected signal. This enhances the validity of the detected signal, particularly when compared to the prior art devices of FIGS. 1 and 2. In addition, construction of the invention is relatively uncomplicated when compared with the prior art devices.

The design details of the components of the preferred embodiment are well established in the art. A designer need only choose from a goodly variety of lasers, beamsplitters, single-mode fibers, etc., to fabricate the novel optical hydrophone hereinabove described.

Obviously, many other modifications and variations of the present invention are possible in the light of the above teachings. It is therefore to be understood that within the scope of the appended claims the invention may be practiced otherwise than as specifically described.

What is claimed is:

1. An apparatus for passively and remotely sensing the amplitude and frequency of impinging acoustic energy comprising:
    means for providing a source of coherent light;
    means orientated to receive coherent light from the coherent light providing means for bidirectionally transmitting the coherent light therethrough, the bidirectionally transmitting means is a single-mode fiber simultaneously transmitting a reference component of the coherent light and a reflected component of the coherent light; and
    an optical resonator connected to the bidirectionally transmitting means having one portion displaceable in accordance with the impinging acoustic energy.

2. An apparatus according to claim 1 in which the optical resonator further includes a dielectric coated end of the single-mode fiber functioning as a fixed mirror and the one portion is a movable mirror displaceable to change the separation from the dielectric coated end.

3. An apparatus according to claim 2 further including:
    a beamsplitter interposed between the coherent light producing means and the single-mode fiber.

4. An apparatus according to claim 3 further including:
    a detector disposed to receive the reflected component of coherent light from the beamsplitter for measuring the magnitude of the reflected component of coherent light.

* * * * *